US012697824B2

(12) United States Patent
Morikawa et al.

(10) Patent No.: US 12,697,824 B2

(45) Date of Patent: Aug. 4, 2026

(54) HEATING APPARATUS, IMAGE FORMING APPARATUS, AND LIQUID DISCHARGE APPARATUS

(71) Applicants: Yusuke Morikawa, Kanagawa (JP); Hiroshi Kato, Kanagawa (JP)

(72) Inventors: Yusuke Morikawa, Kanagawa (JP); Hiroshi Kato, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 103 days.

(21) Appl. No.: 18/817,388

(22) Filed: Aug. 28, 2024

(65) Prior Publication Data

US 2025/0083460 A1 Mar. 13, 2025

(30) Foreign Application Priority Data

Sep. 8, 2023 (JP) ................................ 2023-146333

(51) Int. Cl.

| | |
|---|---|
| ***B41M 7/00*** | (2006.01) |
| ***B41J 11/00*** | (2006.01) |
| ***B41J 29/377*** | (2006.01) |
| ***G03G 15/20*** | (2006.01) |

(52) U.S. Cl.

CPC .......... *B41J 11/0024* (2021.01); *B41J 11/002* (2013.01); *B41J 29/377* (2013.01); *B41M 7/009* (2013.01); *G03G 15/2007* (2013.01)

(58) Field of Classification Search

None

See application file for complete search history.

(56) References Cited

U.S. PATENT DOCUMENTS

2014/0294469 A1* 10/2014 Okuma .............. G03G 15/2007 399/330
2017/0173973 A1* 6/2017 Tsutsui ..................... B41J 29/38
2017/0248879 A1 8/2017 Ishigaya et al.
2017/0255136 A1* 9/2017 Yamashita ................ F28F 9/26
2023/0391107 A1 12/2023 Onodera et al.
2024/0066891 A1* 2/2024 Kuwabara ............ B41J 11/0015
2024/0174003 A1 5/2024 Kido et al.

FOREIGN PATENT DOCUMENTS

JP 2011-190511 A 9/2011
JP 2017-151286 A 8/2017
JP 2017-223917 A 12/2017
JP 2024-035076 A 3/2024

* cited by examiner

*Primary Examiner* — Shelby L Fidler

(74) *Attorney, Agent, or Firm* — XSENSUS LLP

(57) ABSTRACT

A heating apparatus includes: a heating rotator to heat a medium; a heat source including: a glass tube disposed inside the heating rotator to generate radiant heat; and a sealing on each of both ends of the glass tube in an axial direction of the heating rotator; a heater holder to hold the heat source inside the heating rotator; a support having an outer diameter smaller than an inner diameter of the heating rotator to support the heater holder inside the heating rotator; and a gas supply disposed outside an outer end of the heating rotator in the axial direction, the gas supply to supply gas to the sealing through the support in the axial direction, wherein the heating rotator has an air hole facing the sealing.

11 Claims, 8 Drawing Sheets

FIG. 7

| TEMPERATURE (°C) OF SEALING PORTION BASED ON LIGHTING DUTY OF HEATER LAMP | OPENING RATE (%) OF VALVE |
|---|---|
| 350 | Q1 |
| 330 | Q2 |
| 320 | Q3 |
| 310 | Q4 |
| 300 | Q5 |
| ⋮ | ⋮ |
| 200 | ABSENCE OF OPENING AND CLOSING OPERATION (GAS IS NOT SUPPLIED) |

HEATING APPARATUS, IMAGE FORMING APPARATUS, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2023-146333, filed on Sep. 8, 2023, in the Japan Patent Office, the entire disclosure of which is hereby incorporated by reference herein.

BACKGROUND

Technical Field

Embodiments of this disclosure relate to a heating apparatus, an image forming apparatus, and a liquid discharge apparatus.

Related Art

A heating roller is used in a drying apparatus of an inkjet printer, and conveys a medium such as a sheet to which ink has been applied while heating the medium to quickly dry the ink. Such a drying apparatus enables the ink on the medium to be quickly dried since the medium to which the ink has been applied is conveyed by the heating roller. Moreover, a fixing belt that is used in an electrophotographic copier includes a heater lamp (e.g., an infrared lamp and a halogen heater lamp) as a heat source disposed inside to keep a surface of the fixing belt at high temperature. The halogen heater is a radiant-heat type heat source that emits an infrared ray to heat a heating target object by using radiant heat of the emitted infrared ray. Particularly, the halogen heater includes a filament as a heating element and a cylindrical light emitting tube (a cylindrical glass tube) in which the filament is stored. In addition to the filament, a halogen material and inert gas are enclosed inside the light emitting tube. Thus, a sealing is formed on each of both ends of the light emitting tube such that the gas inside the light emitting tube is not leaked.

SUMMARY

In an aspect of the present disclosure, a heating apparatus includes: a heating rotator to heat a medium; a heat source including: a glass tube disposed inside the heating rotator to generate radiant heat; and a sealing on each of both ends of the glass tube in an axial direction of the heating rotator; a heater holder to hold the heat source inside the heating rotator; a support having an outer diameter smaller than an inner diameter of the heating rotator to support the heater holder inside the heating rotator; and a gas supply disposed outside an outer end of the heating rotator in the axial direction, the gas supply to supply gas to the sealing through the support in the axial direction, wherein the heating rotator has an air hole facing the sealing, and the air hole discharges the gas blown to the sealing from the air hole in a transverse direction orthogonal to the axial direction.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 7 is a control table illustrating a relation between a temperature of a sealing based on lighting duty and an opening rate of a valve.

Figure 1:
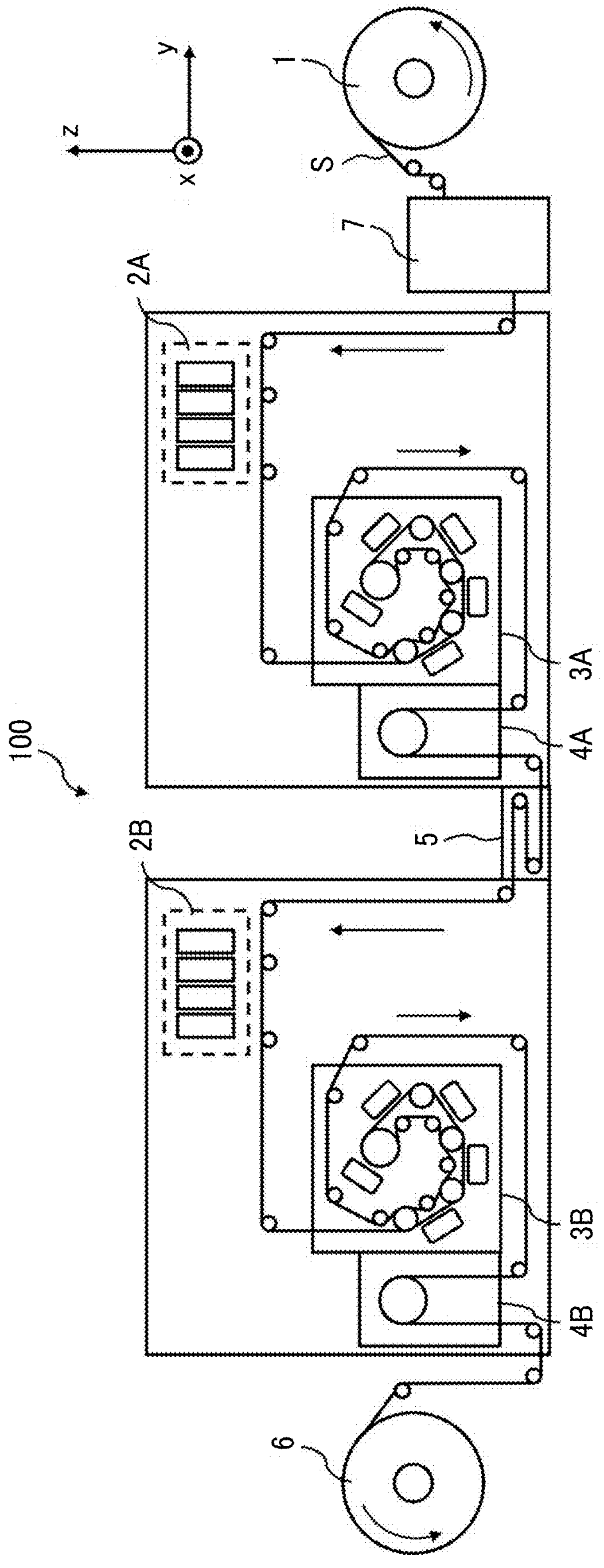
FIG. 1 is a schematic diagram illustrating a configuration of an inkjet image forming apparatus according to one embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiment

Hereinafter, an embodiment of the present disclosure is described with reference to the drawings.

In each of the drawings, elements such as members and components having the same function or shape are given the same reference numerals as long as the same function or shape can be determined, and redundant descriptions thereof are omitted.

[Inkjet Image Forming Apparatus]

FIG. 1 is a schematic diagram illustrating an inkjet image forming apparatus 100 according to one embodiment of the present disclosure. A description of the inkjet image forming apparatus 100 according to the present embodiment is given with reference to FIG. 1.

The inkjet image forming apparatus 100 illustrated in FIG. 1 includes an unwinding unit 1 as a sheet supply unit, a pre-processing unit 7, a printing unit 2A, a drying unit 3A, a cooling unit 4A, a turn bar 5 as a front-back reverse unit, a printing unit 2B, a drying unit 3B, a cooling unit 4B, and a winding unit 6 as a sheet collection unit.

The unwinding unit 1 includes a supply roller around which a medium S that is a long sheet is wound in a roll shape. The unwinding unit 1 is rotated in a direction indicated by an arrow illustrated in FIG. 1, so that the medium S is fed. The fed medium S is supplied to the pre-processing unit 7.

The pre-processing unit 7 includes a treatment liquid applying device that applies treatment liquid to one side or two sides of the medium S which has been supplied from the unwinding unit 1. An example of the treatment liquid includes liquid having a function of aggregating ink. The treatment-liquid applying device applies the treatment liquid to the medium S before an image is formed so that image quality is enhanced. The image quality enhancement includes prevention of ink from bleeding through the medium S, and assistance in ink permeation. The medium S to which the treatment liquid has been applied is supplied to the printing unit 2A.

The printing unit 2A includes a plurality of liquid discharge heads as a liquid discharge unit that discharges liquid ink. In the example illustrated in FIG. 1, liquid discharge heads for black ink, cyan ink, magenta ink, and yellow ink are disposed in this order from the upstream side in a conveyance direction of the medium S. A liquid discharge head for special ink of white ink or metallic ink other than black, cyan, magenta, and yellow ink may be appropriately added depending on the intended use. The arrangement of each of the liquid discharge heads is not limited to the arrangement order illustrated in FIG. 1, and the liquid discharge heads can be arranged in an optional order. Ink is liquid containing a color material, a solvent, and crystalline resin particles dispersed in the solvent. The crystalline resin is resin that melts from a crystal state to liquid by phase change when the resin is heated to a predetermined melting point or higher. When the medium S is supplied to the printing unit 2A, each of the liquid discharge heads discharges ink to a front surface (a first surface) of the medium S, and an image is formed on the front surface of the medium S.

The drying unit 3A is a drying apparatus that heats the medium S to dry ink on the medium S. When the medium S is supplied from the printing unit 2A to the drying unit 3A, the medium S is heated by the drying unit 3A which is the drying apparatus, and ink on the medium S is dried. The drying unit 3A is described in detail below.

The cooling unit 4A includes a cooling roller. When the medium S is supplied from the drying unit 3A to the cooling unit 4A, the medium S contacts the cooling roller. Thus, the medium S is cooled.

The turn bar 5 is a device that reverses positions of the front side and the back side of the medium S. When the medium S supplied from the cooling unit 4A passes the turn bar 5, the front and the back of the medium S is reversed, and the reversed medium S is conveyed to the printing unit 2B. For example, if the medium S is supplied to the turn bar 5 with the front side of the medium S facing upward, the turn bar 5 reverses the medium S such that the front side faces downward (the back side faces upward). Then, the medium S with the front side facing downward is supplied to the printing unit 2B.

Similar to the printing unit 2A, the printing unit 2B includes a plurality of liquid discharge heads. In the printing unit 2A, an image is formed on the front surface of the medium S. In the printing unit 2B, on the other hand, an image is formed on the back surface (a second surface) of the medium S. That is, the medium S is supplied to the printing unit 2B in a state in which the front and back of the medium S are reversed by the turn bar 5 of the front-back reverse unit. Accordingly, when such a medium S is supplied to the printing unit 2B, ink is discharged from each of the discharge heads to the back surface of the medium S, and an image is formed on the back surface of the medium S.

Configurations of the drying unit 3B and the cooling unit 4B are similar to those of the drying unit 3A and the cooling unit 4B. Accordingly, after an image is formed on the back surface of the medium S in the printing unit 2B, the medium S is supplied to the drying unit 3B. In the drying apparatus of the drying unit 3B, the medium S is heated, and the image on the medium S is dried. Subsequently, the medium S is cooled by the cooking roller of the cooling unit 4B.

The winding unit 6 includes a collection roller that collects the medium S by winding the medium S. When the collection roller is rotated in a direction indicated by an arrow illustrated in FIG. 1, the medium S is collected and wound in a roll shape.

[Drying Apparatus]

Next, basic configurations of the drying unit 3A and the drying unit 3B as drying apparatuses are described. Since configurations of the drying apparatuses are substantially the same, a description is only given of a configuration of the drying unit 3A (the drying apparatus), and a description of a configuration of the drying unit 3B (the drying apparatus) is omitted.

Figure 2:
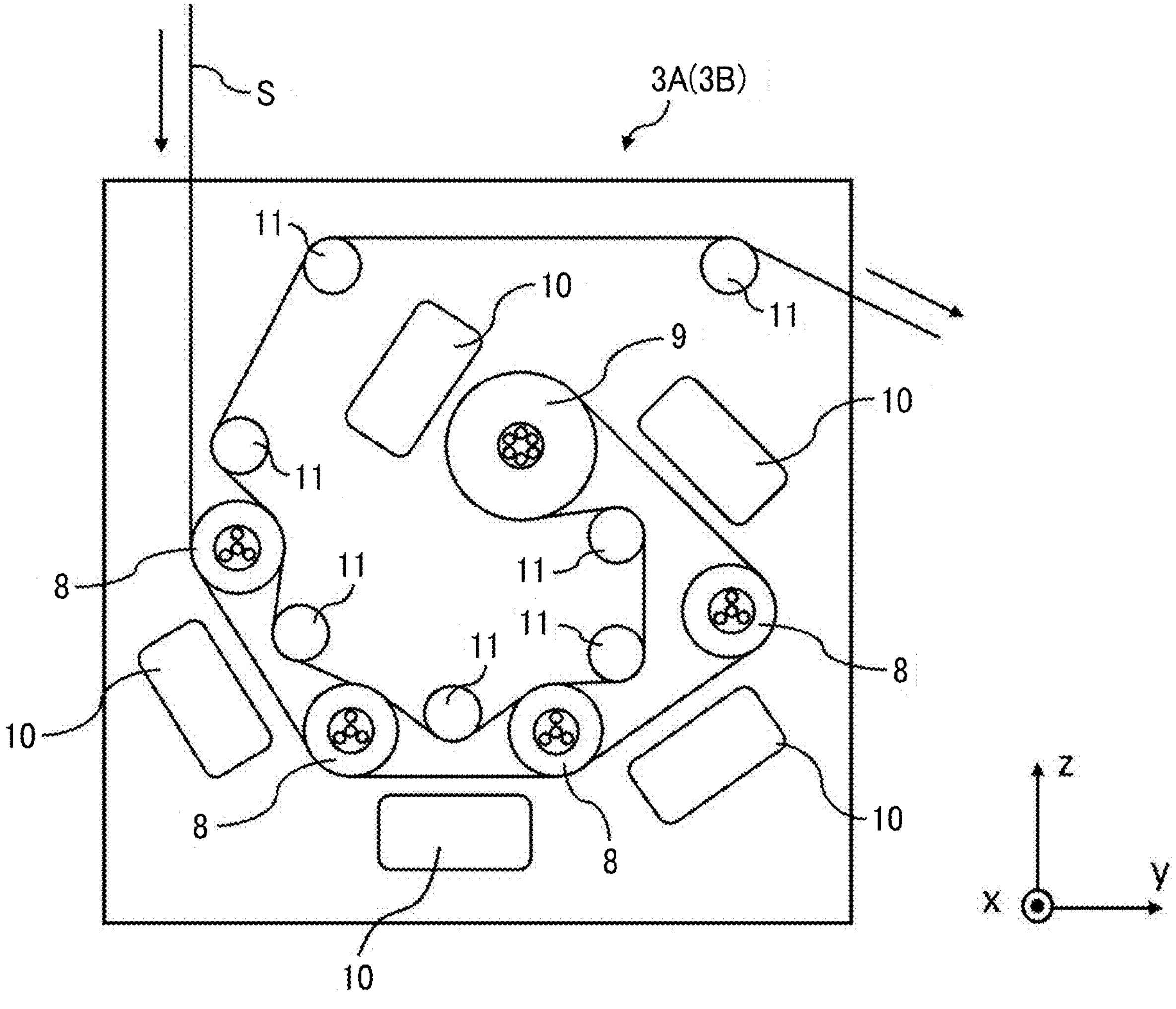
FIG. 2 is a schematic diagram illustrating a drying unit according to the present embodiment.

FIG. 2 is a schematic diagram illustrating the drying unit 3A (3B) according to the present embodiment. As illustrated in FIG. 2, the drying unit 3A (3B) of the present embodiment includes a plurality of heating rollers 8, a heating drum 9 as a heating rotator, a plurality of guide rollers 11, and a plurality of air knives 10 as air blow-out units. Each of the heating roller 8 and the heating drum 9 is a contact-type heater that heats a medium S as a heating target object by contacting the medium S. Each of the heating roller 8 and the heating drum 9 conveys the medium S while heating the medium S, so that ink on the medium S is quickly dried. Moreover, since the air knife 10 blows air to ink on the medium S to break a steam film, the air knife 10 has a function of facilitating ink evaporation by breaking the steam film.

The plurality of heating rollers 8 and the plurality of guide rollers 11 are arranged near the heating drum 9. Unlike the heating roller 8 and the heating drum 9, the guide roller 11 does not include a heat source such as a halogen heater lamp inside. The guide roller 11 functions as a guide that guides the medium S. The medium S is provided around each of the heating rollers 8 and the heating drum 9 in addition to each of the guide rollers 11. The heating rollers 8, the heating drum 9, and the guide rollers 11 form a guiding path by which the medium S is guided.

When the medium S is conveyed into the drying unit 3A, the medium S is first provided to an outer side of the heating roller 8, and then conveyed while contacting an outer side of each of the plurality of heating rollers 8. Subsequently, the medium S is wound around the heating drum 9. The medium S is provided to the guide roller 11 from the heating drum 9, and then conveyed while contacting an inner side of each of the plurality of heating rollers 8. Accordingly, after the medium S is conveyed while contacting the outer sides of the heating rollers 8, the medium S is wound around the heating drum 9 and is further conveyed while contacting the inner sides of the heating rollers 8. Hence, the medium S is heated with good efficiency, and ink on the medium S is quickly dried.

The air knives 10 are arranged not only in positions in which the medium S is stretched by the heating roller 8 and the guide roller 11 but also in a position opposite the heating drum 9. Each of these air knives 10 blows air to the medium S, so that ink on the medium S is dried in a quicker manner. Subsequently, the medium S is conveyed outside the drying unit 3A.

Herein, the heating roller 8 and the heating drum 9 are described in detail. The heating roller 8 is a roller (a cylindrical member) having a diameter that is smaller than a diameter of the heating drum 9. The heating roller 8 includes a heater lamp as a heat source inside. As for the heater lamp, a halogen heater lamp including a glass tube (a light emitting tube) and a sealing is used. The glass tube includes a filament that generates radiant heat, and the sealing is arranged on each of both ends of the glass tube. The sealing has a function of preventing gas inside the glass tube from leaking. The heating drum 9 is a roller (a cylindrical member) having a larger diameter than the heating roller 8, and includes a heater lamp 14 (one example of a heat source) as a heat source inside. The halogen heater lamp 14 is similar to the halogen heater lamp in the heating roller 8.

In the present embodiment, the heating roller 8 has an outer diameter of φ100 mm, and an end of the heater lamp as the heat source is held by a member disposed on an end of the heating roller 8. Moreover, the heating roller 8 including the heater lamp can be detached in maintenance work such as replacement.

On the other hand, the heating drum 9 (one example of a heating rotator) of the present embodiment has an outer diameter of 200 mm. The heating drum 9 has an end that is inserted into a bearing 13 on a hole arranged in a frame 12 of the drying unit 3A (3B). With the insertion of the end of the heating drum 9 into the bearing 13, the heating drum 9 is attached. In the present embodiment, the heating drum 9 is basically configured not to be detached even in maintenance work such as replacement. However, the present embodiment is not limited thereto.

The heating drum 9 includes the heater lamp 14 as the heat source as described above, and the heater lamp 14 is held by a supporting rod 16 (one example of a support) described below. In a case where the heater lamp 14 is to be replaced during maintenance, the heater lamp 14 with the supporting rod 16 is detached, so that the heater lamp 14 can be replaced.

The heating drum 9 has an outer diameter of φ200 mm as described above, and thus drying ability of the heating drum 9 is higher than the heating roller 8. Since the heating drum 9 has a larger diameter, an output necessary to keep the surface temperature high is greater than the heating roller 8. Accordingly, the number of heater lamps needed is greater. Thus, sealings 17 of the heater lamps 14 are closely arranged on the end of the heating drum 9. Such close arrangement of the sealings 17 causes temperature of the sealings to be increased by heat. In addition, a thick sheet may be conveyed, or a sheet conveyance speed may be increased to enhance productivity. In such a case, since the heater lamp 14 needs to be turned on at high duty, temperature of the sealing 17 tends to be increased. An increase in temperature of the sealing 17 may degrade or damage the sealing 17 depending on circumstances. Thus, it is conceivable that a configuration for decreasing the temperature of the sealing 17 or cooling the sealing 17 is provided to prevent the degradation in the sealing 17 or the damage to the sealing 17. In the present embodiment, since the sealing 17 may be damaged when a temperature of the sealing 17 reaches 350° C. or higher, a temperature of the sealing 17 needs to be 350° C. or less, desirably 300° C. or less. Moreover, when the sealing 17 is cooled, heating efficiency of the heater lamp 14 needs to be prevented from degradation. Hence, the configurations described below are employed in the present embodiment.

[Configuration of Heating Drum]

Figure 3A:
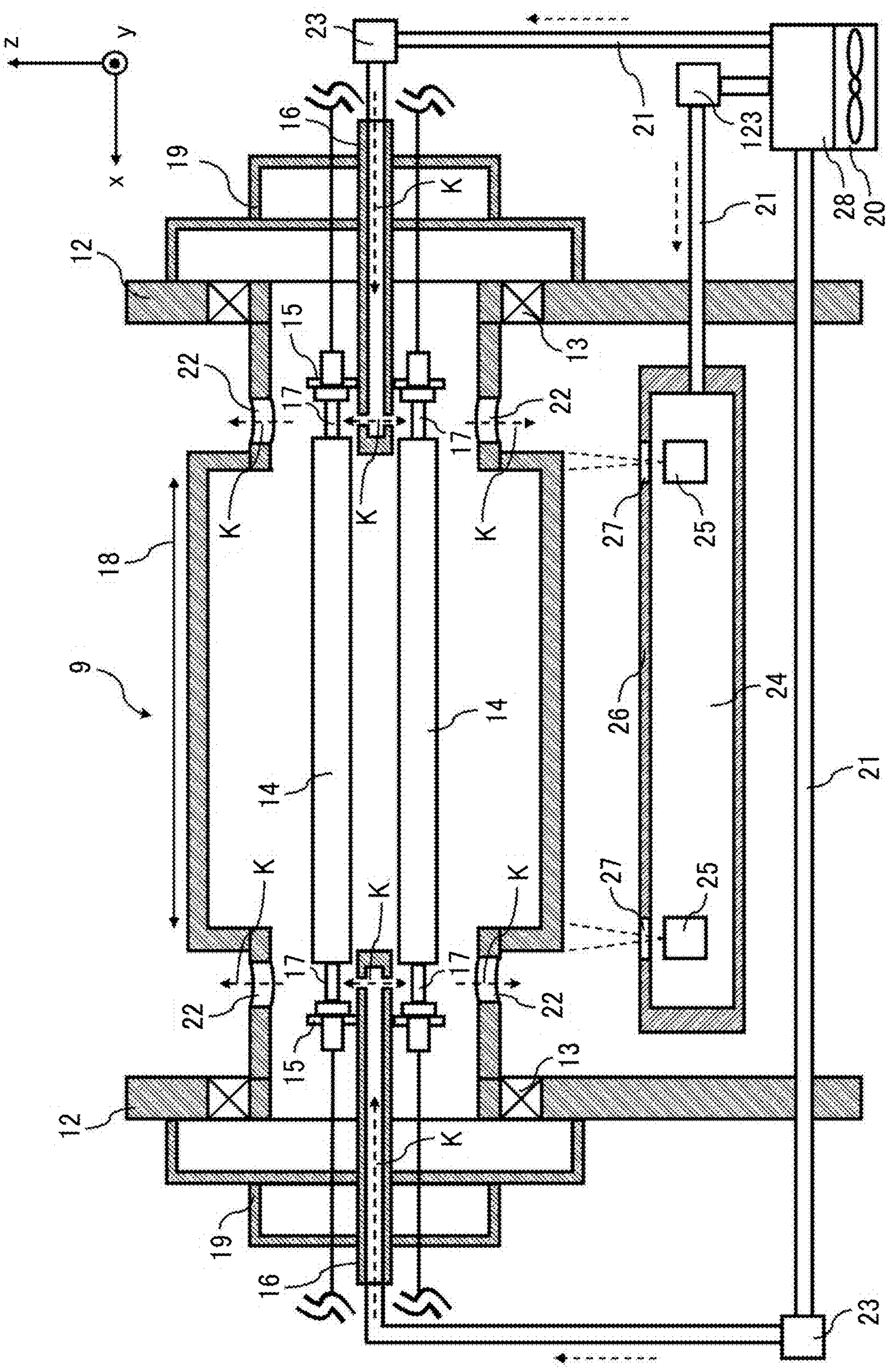
FIG. 3A is a sectional view illustrating a heating drum of the drying unit and the periphery thereof.
Figure 3B:
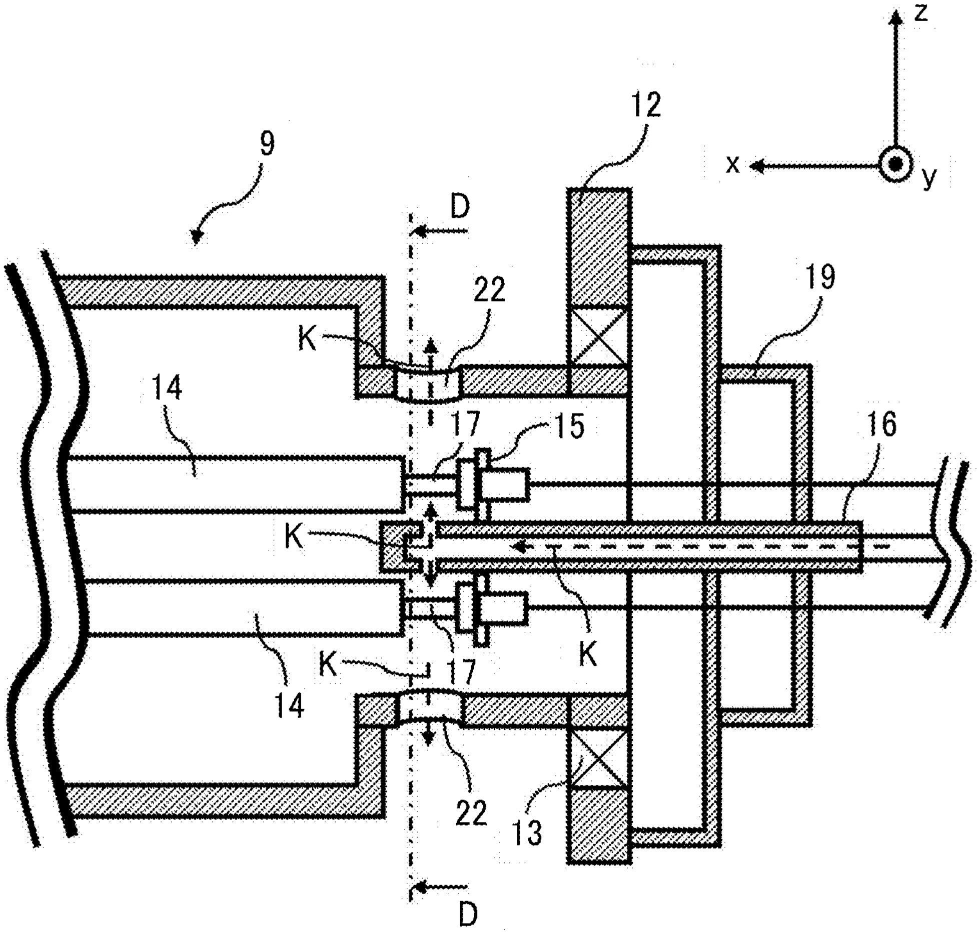
FIG. 3B is a diagram illustrating details of an end of the heating drum in a rotation axis direction.

Herein, the heating drum 9 as a characteristic of the present embodiment is described with reference to FIGS. 3A and 3B. FIG. 3A is a sectional view illustrating the heating drum 9 of the drying unit and a configuration in the periphery of the heating drum 9 according to the present embodiment. FIG. 3B is a diagram illustrating details of a configuration of an end of the heating drum 9 in a rotation axis direction according to the present embodiment. FIG. 3B is an enlarged view of the right end of the heating drum 9 illustrated in FIG. 3A. Particularly, the right end of the heating drum 9 in the rotation axis direction (in an X axis direction) is illustrated.

As illustrated in FIG. 3A, the heating drum 9 is held by the frame 12 (one example of a frame) via the bearing 13 which rotatably supports the heating drum 9. The heater lamp (the halogen heater lamp) 14 as a heat source is disposed inside the heating drum 9. In FIG. 3A, two heater lamps 14 are illustrated for the sake of description. In the present embodiment, however, the heating drum 9 includes six heater lamps 14. The heater lamp 14 is supported by a heater lamp holder 15 (one example of a heater holder) and the supporting rod 16 which supports the heater lamp holder 15 such that the sealing 17 of the heater lamp 14 is positioned outside a medium conveyance path 18 (one example of a conveyance region) of the heating drum 9. The sealing 17 is supported in such a position, so that the sealing 17 cannot overlap a medium S as a dry target.

The supporting rod 16 is supported by a metal plate member 19 so as not to be inclined. The metal plate member 19 supports the supporting rod 16. The supporting rod 16 includes a cylinder having a cavity portion inside. The supporting rod 16 has an outer diameter that is smaller than an inner diameter of the heating drum 9. The supporting rod 16 takes gas from a blower source 20 (one example of a gas supply) that is disposed outside an outer end of the heating drum 9 in the axial direction. The gas which has been taken can pass through the cavity portion of the supporting rod 16.

The term "gas" used in the present embodiment is a matter that is supplied by suctioning the air outside the drying unit as is, and a temperature of the gas to be taken is between 25° C. and 35° C. Such gas is merely one example, and gas having a lower temperature can be supplied. The gas may be referred to as air. The term "outer" or "outside" used herein represents a side on which the metal plate member 19 is positioned in a rotation axis direction (an x-axis direction) of the heating drum 9 illustrated in FIG. 3A, whereas the term "inner" or "inside" represents a side opposite the outer or the outside.

From a standpoint that gas is readily taken from the blower source 20, and gas is readily sent to the sealing 17, the supporting rod 16 extends (protrudes) to the outside relative to the frame 12 in the rotation axis direction (the x direction). The supporting rod 16 has a plurality of holes arranged on an inner end, and the gas which has been taken is blown to the sealing 17 in a direction perpendicular to the rotation axis direction via the plurality of holes. A flow of gas (air) is represented by a broken line indicated by an arrow K illustrated in FIG. 3A.

The blower source 20 as an air blower supplies gas. The supplied gas reaches the supporting rod 16 via a gas supply path (an air supply path) 21. The gas supply path 21 includes an air blowing tube.

A ventilation hole 22 (one example of an air hole) is positioned on a face of the heating drum 9 facing the sealing 17. The ventilation hole 22 has a function of letting the gas blown to the sealing 17 escape to the outside of the heating drum 9 as illustrated by a broken line indicated by an arrow K illustrated in FIG. 3B. With such a configuration, the gas flows inside the heating drum 9 to cool the heater lamp 14, and a decrease in heating efficiency is prevented. Moreover, the ventilation hole 22 has a function of further facilitating cooling of the sealing 17 by exposing the sealing 17 to the outside air (atmosphere) outside the heating drum 9. The ventilation hole 22 is positioned outside the medium conveyance path 18 of the heating drum 9 so that the ventilation hole 22 does not overlap a medium S as a dry target when letting the gas escape. The ventilation hole 22 is configured in a direction perpendicular to the rotation axis direction. In a case where the ventilation hole 22 is not configured in such a direction, gas hits the light emitting tube of the heater lamp 14. Consequently, the heater lamp 14 is cooled, causing a decrease in heating efficiency of the heater lamp 14. From a standpoint of prevention of such a situation, the above-described configuration is provided.

In addition, as illustrated in FIG. 3A, a valve 23 (one example of a gas adjuster) as a gas adjustment valve is disposed at an intermediate position of the gas supply path 21. The valve 23 includes an operation unit, and is opened or closed by the operation unit. The valve 23 has a function of adjusting an amount of gas to be supplied to the sealing 17 by adjustment of an opening area of the valve 23. For example, in a case where a heater lamp as a heat source having a higher output is disposed, an increase in the opening area can increase a gas supply amount (an air supply amount).

In the present embodiment, moreover, a temperature sensor unit 24 is disposed opposite the heating drum 9. The temperature sensor unit 24 includes a non-contact temperature sensor 25 inside. The non-contact temperature sensor 25 detects temperature of the heating drum 9 via an opening hole 27 as an opening arranged on a cover 26 of the temperature sensor unit 24. When temperature of the heating drum 9 is detected by each temperature sensor 25, a control unit (a central processing unit (CPU) 60 (one example of circuitry) described below controls heat generation (light emission) of the heater lamp 14 based on the detected temperature. Thus, a surface temperature of the heating drum 9 remains at predetermined temperature.

In a case where paper powder or dust is attached to a detection surface of the temperature sensor 25, an error occurs in temperature detection. To prevent such an error, in the present embodiment, an air blowing distribution box 28 (one example a gas distributor, also referred to as an air distributor) is disposed, and the gas supply path 21 is extended from the blower source 20 to the temperature sensor unit 24 to supply gas. The air blowing distribution box 28 has a function of distributing gas from the blower source 20 to the sealing 17 and the temperature sensor unit 24. The gas distributed to the sealing 17 cools the sealing 17. One example of the air blowing distribution box 28 includes a plurality of tubes, and gas is distributed using the plurality of tubes. In addition, a sensor valve 123 as a gas adjustment valve (an air adjustment valve) is disposed at an intermediate position between the blower source 20 and the temperature sensor unit 24. The sensor valve 123 is opened, so that gas can be supplied to the temperature sensor unit 24.

When gas is supplied into the temperature sensor unit 24, the inside of the cover 26 of the temperature sensor unit 24 shifts to a positive pressure state, and the gas is ejected from the opening hole 27 which is for detection and arranged on the cover 26. Accordingly, a foreign matter does not tend to be entered inward from the opening hole 27, and thus attachment of the foreign matter to the detection surface of the temperature sensor 25 can be prevented, thereby maintaining the detection surface in a good state.

In the present embodiment, therefore, the blower source 20 supplies gas not only to the sealing 17 but also to an interior of the temperature sensor unit 24. Such a configuration can prevent an increase in temperature of the sealing 17 of the heater lamp 14. In addition, the detection surface of the temperature sensor 25 can be prevented from being soiled.

In the present embodiment, moreover, since the use of a common (a single) air blower (the blower source 20) enables gas to be supplied to both of the sealing 17 and the interior of the temperature sensor unit 24, the apparatus can be made compact and the cost of the apparatus can be lowered. That is, the blower source 20 as the air blower and the gas supply path 21 diverging toward the temperature sensor unit 24 can lead gas from the blower source 20 to both of the sealing 17 and the interior of the temperature sensor unit 24. According to the present embodiment, since an air blower for supplying gas to the sealing 17 and an air blower for supplying gas to the temperature sensor unit 24 do not need to be disposed separately, the number of air blowers can be reduced. Therefore, the apparatus can be made compact, and the cost of the apparatus can be reduced.

Figure 4:
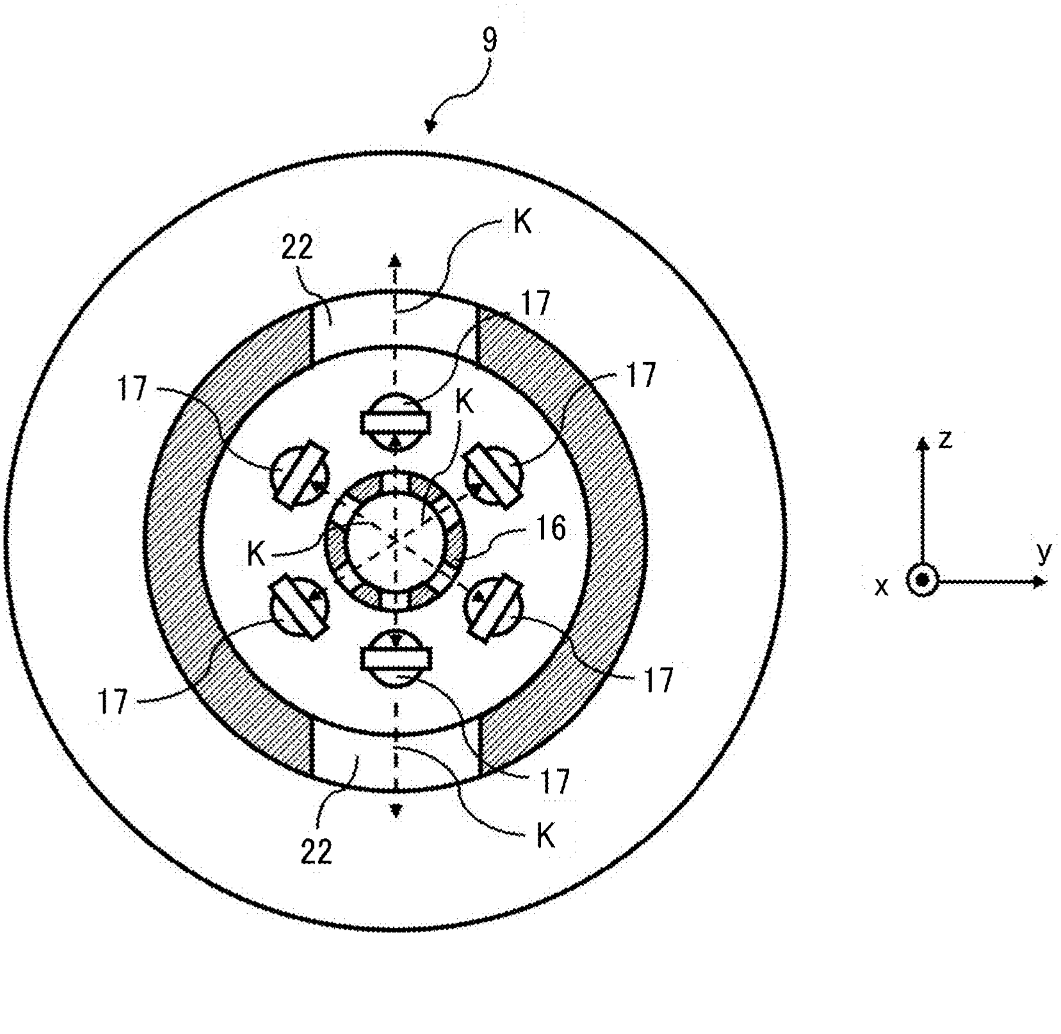
FIG. 4 is a sectional view along the line D-D of FIG. 3B.

Herein, the supply of gas to the sealing 17 is described from a different viewpoint. FIG. 4 is a sectional view along the line D-D of FIG. 3B, as seen from a positive direction of an x axis. Moreover, FIG. 4 illustrates a state in which gas is blown toward the sealing 17 from the supporting rod 16. As illustrated in FIG. 4, the supporting rod 16 has a plurality of holes that are radially arranged around a shaft, and gas is supplied (blown) toward the sealing 17 from the hole. In the present embodiment, six holes are arranged, and each of the holes has an inner diameter of 2 mm to 3 mm. In FIG. 4, there are six sealings 17, and the six holes corresponds to the number of sealings 17. A flow of gas (air) is represented by a broken line indicated by an arrow K illustrated in FIG. 4.

The gas blown to the sealing 17 is moved to the outside of the heating drum 9 via the ventilation hole 22 arranged in a direction (a z-axis direction) perpendicular to the rotation axis direction (the x-axis direction) of the heating drum 9.

In the present embodiment, two ventilation holes 22 are arranged. However, the present exemplary embodiment is not limited thereto as long as a strength of the heating drum 9 can be maintained. For example, three or more ventilation holes 22 may be arranged. In the present embodiment, a gas supply amount (an air flow rate) at an end of the supporting rod 16 is set to 2 m/s to 3 m/s. The ventilation hole 22 is set to have an inner diameter of 24 mm to 26 mm.

According to the present embodiment, the aforementioned configuration can prevent an increase in temperature of the sealings due to close arrangement of the sealings in association with an increase in the number of heater lamps disposed inside the heating drum, and can enhance heating efficiency without lowering temperature of a light emitting tube in the heater lamp.

[Method for Cooling Sealing]

Herein, an example of a method for cooling the sealing 17 is described using FIG. 3A. As for the sealings 17 on both ends of the heater lamp 14, the sealing 17 positioned on a positive side of the x axis in FIG. 3A is referred to as a left sealing for the sake of convenience, whereas the sealing 17 positioned on a negative side of the x axis in FIG. 3A is referred to as a right sealing.

Herein, assuming that a temperature of the left sealing 17 is 310° C., and a temperature of the right sealing 17 is 330° C. In such a case, air is blown to both of the right and left sealings 17. Such air blowing can be considered as a method for lowering the temperature of both of the right and lest sealings 17 to a desired temperature.

Another example is described. Assuming that there may be a temperature difference between the sealings 17 on the both ends depending on an atmosphere temperature distribution inside the drying apparatus or a thermal distribution of the heater lamp 14. For example, assuming that the right sealing 17 (positioned on the negative side of the x axis) in FIG. 3A reaches higher temperature than the left sealing 17 (positioned on the positive side of the x axis) in FIG. 3A.

Herein, a temperature of the left sealing 17 may be 200° C., and a temperature of the right sealing 17 may be 350° C. In such a case, air is not blown to the left sealing 17, and air is blown to only the right sealing 17. Such air blowing can be considered as a method for cooling the right sealing 17. Alternatively, a configuration in which air is blown to only the right sealing 17 can be employed in consideration of cost and assembly involving, for example, the number of air blowing funs of the blower source 20 and ease of arrangement of an air blowing tube (the gas supply path 21) from the blower source 20 to the supporting rod 16.

In the present embodiment, the opening and the closing of the valve 23 is controlled, so that the supply of gas to the sealing 17 as the cooling target can be controlled. The valve 23 is opened and closed by the CPU 60. The temperature of the sealing 17 is specified based on lighting duty (a rate of energized time per unit time) of the heater lamp 14 inside the heating drum 9. For example, if the left sealing 17 and the right sealing 17 respectively have temperatures of 200° C. and 350° C. based on the lighting duty, the CPU 60 opens the valve 23 corresponding to the right sealing 17 to supply gas such that the right sealing 17 is cooled.

Figure 5:
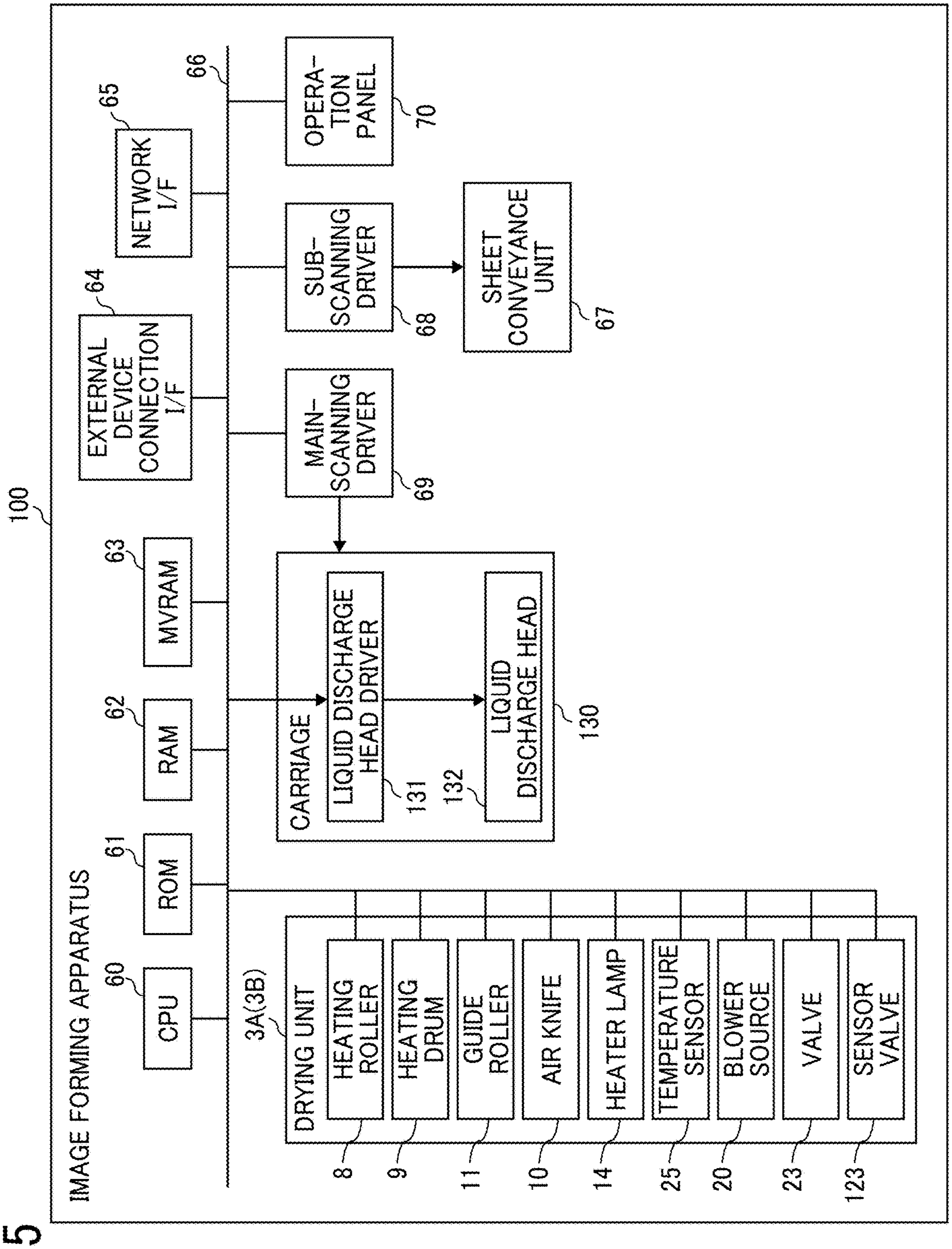
FIG. 5 is a block diagram illustrating a control system of the image forming apparatus according to the present embodiment.

In the present embodiment, a relation between the lighting duty of the heater lamp 14 and the temperature of the sealing 17 can be ascertained beforehand and stored in a storage such as a read only memory (ROM) 61 illustrated in FIG. 5. Accordingly, the CPU 60 can determine a case in which the supply of gas to the sealing 17 is necessary based on the lighting duty of the heater lamp 14. In addition, the CPU 60 can determine whether to cool only the right or left sealing 17, or both of the sealings 17. The temperature of the sealing 17 is often higher at the time of high duty printing operation in which the heater lamp 14 inside the heating drum 9 needs to be turned on at a higher duty than normal, for example, when a thick sheet is conveyed or a sheet conveyance speed is increased.

The opening and closing of the valve 23 are controlled based on the lighting duty of the heater lamp 14 inside the heating drum 9 as described above. Alternatively, the opening and closing of the valve 23 may be controlled by the CPU 60 illustrated in FIG. 5 based on an operation mode selected by an operator.

[Control System]

FIG. 5 is a block diagram illustrating a control system of an image forming apparatus 100 according to the present embodiment.

As illustrated in FIG. 5, the image forming apparatus 100 of the present embodiment includes the CPU 60, the ROM 61, a random access memory (RAM) 62, a non-volatile random access memory (NVRAM) 63, an external device connection interface (I/F) 64, a network I/F 65, and a bus line 66. Moreover, the image forming apparatus 100 includes a sheet conveyance unit 67, a sub-scanning driver 68, a main-scanning driver 69, a carriage 130, and an operation panel 70. The carriage 130 includes a liquid discharge head 132 and a liquid discharge head driver 131.

The CPU 60 is a control unit that comprehensively controls operations of the image forming apparatus 100. The ROM 61 stores, for example, a program such as an initial program loader (IPL) to be used in driving of the CPU 60. The RAM 62 is used as a work area of the CPU 60. The NVRAM 63 stores various data including a program, and retains the various data even when a power source of the image forming apparatus 100 is being off.

The external device connection I/F 64 is connected to a personal computer (PC) via an element such as a universal serial bus (USB) cable, and communication including transmission of a control signal and print data is performed between the external device connection I/F 64 and the PC. The network I/F 65 is an interface for data communication by using a communication network such as the Internet. The bus line 66 is, for example, an address bus and a data bus for electrical connection of the CPU 60 to each component.

The sheet conveyance unit 67 includes, for example, a roller and a motor for driving the roller. The sheet conveyance unit 67 intermittently conveys a sheet in a sub-scanning direction (a sheet conveyance direction) along a conveyance path inside the image forming apparatus 100. The sub-scanning driver 68 is a driver that controls the conveyance of the sheet by the sheet conveyance unit 67 in the sub-scanning direction.

The carriage 130 includes the liquid discharge head 132, and is a head holder movable in a main-scanning direction intersecting with the sheet conveyance direction. The liquid discharge head 132 discharges ink to the sheet intermittingly conveyed in the sub-scanning direction while the carriage 130 is moving in the main-scanning direction, thereby forming an image in a predetermined position on the sheet. Herein, the main-scanning driver 69 controls the movement of the carriage 130 in the sub-scanning direction, whereas the liquid discharge head driver 131 controls the driving of the liquid discharge head 132.

The liquid discharge head driver 131 may not be arranged in the carriage 130. In such a case, the liquid discharge head driver 131 may be connected to a bus line outside the carriage 130. Each of the main-scanning driver 69, the sub-scanning driver 68, and the liquid discharge head driver 131 may function by an instruction issued by the CPU 60 based on a program.

The operation panel 70 displays, for example, the current setting value and a selection screen. The operation panel 70 includes an alarm lamp and a touch panel that receives an input from an operator.

The CPU 60 also controls an operation of each component of the drying units 3A and 3B disposed in the image forming apparatus 100. For example, the CPU 60 controls a rotation operation of each of the heating roller 8, the heating drum 9, and the guide roller 11, an air blowing operation of the air knife 10, an air blowing operation of the blower source 20 as an air blower, an operation of the valve 23 as a gas adjustment valve, and a release rate (an opening rate) of the sensor valve 123. Moreover, the CPU 60 controls a heat generation operation of the heater lamp 14 inside the heating drum 9 based on the temperature of the heating drum 9 detected by the temperature sensor 25.

[Control Process According to Present Embodiment]

Figure 6:
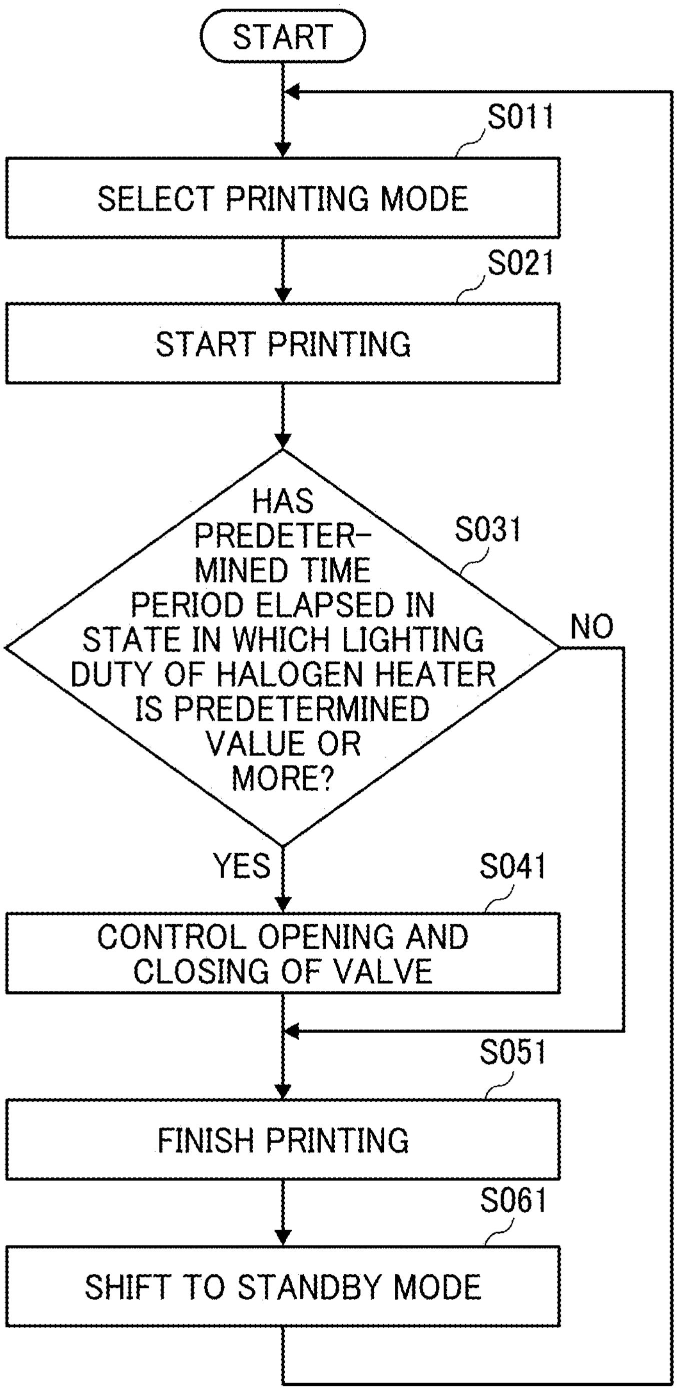
FIG. 6 is a flowchart illustrating one example of control of a gas supply according to the present embodiment.

FIG. 6 is a flowchart illustrating one example of a control of a gas supply according to the present embodiment.

As illustrated in FIG. 6, in step S011, the power source of the image forming apparatus 100 is turned on. Then, in step S011, assuming that a printing mode is selected.

If the printing mode is selected, the process proceeds to step S021. In step S021, the image forming apparatus 100 starts printing.

If a lighting duty of the heater lamp 14 inside the heating drum 9 becomes a predetermined value or more, and a such state continues for a predetermined time period by the finish of the printing (YES in step S031), the process proceeds to step S041. In step S041, the CPU 60 controls the opening and closing of the valve 23, and releases (opens) the valve 23. That is, in this case, since there is a possibility that the temperature of the sealing 17 may increase, the CPU 60 controls the valve 23 such that gas is blown to the sealing 17. Moreover, in this case, the CPU 60 determines whether to cool either the right or left sealing 17, or both the right and left sealings 17, and opens the valve 23 based on the determination. If a lighting duty of the heater lamp 14 does not become a determined value or more, or if a state in which a lighting duty of the heater lamp 14 is a predetermined value or more does not continue for a predetermined time period by the finish of the printing although the lighting duty of the heater lamp 14 has become the predetermined value or more (NO in step S031), the image forming apparatus 100 continues the printing with the valve 23 closed. Subsequently, in step S051, the image forming apparatus 100 finishes the printing. Then, in step S601, the image forming apparatus 100 shifts to a standby mode.

Moreover, in the present embodiment, when a printing mode is executed, for example, the CPU 60 opens the valve 23. After the printing is finished, a condition (such as a sheet thickness and a sheet conveyance speed) for the next printing may be the same as a condition for the last printing. In such a case, the image forming apparatus 100 can start the printing with the valve 23 opened from the beginning.

A condition for opening of the valve 23 can be a condition other than the lighting duty of the heater lamp 14. For example, since there is a possibility that the temperature of the sealing 17 may increase even if a sheet conveyance speed is increased, a time at which the valve 23 is to be opened can bet set based on a sheet conveyance speed condition, instead of the lighting duty condition. That is, if a sheet conveyance speed becomes a predetermined value or more, and such a state continues for a predetermined time period by the finish of the printing, the valve 23 can be opened.

The printing mode may be selected after the power source is turned on, and the valve 23 may be opened before printing is started. Then, a lighting duty of the heater lamp 14 inside the heating drum 9 may become a predetermined value or more, and a such a state may continue for a predetermined time period by the finish of the printing. In such a case, the CPU 60 can further open the valve 23. The supply of gas from the blower source 20 in the printing mode can be finished at the same time as the finish of the printing. Alternatively, the supply of gas from the blower source 20 in the printing mode may not be finished at the same time as the finish of the printing, and may be continued even after the heater lamp 14 is turned off.

[Adjustment of Gas Supply Amount]

In the present embodiment, an opening rate (an opening area) of the valve 23 is set, so that an amount of gas to be supplied to the sealing 17 can be adjusted. FIG. 7 is a control table illustrating a relation between temperature of a sealing based on lighting duty of the heater lamp and an opening rate of a valve. A method for adjusting a gas supply amount is described with reference to FIG. 7. Although the control table illustrated in FIG. 7 is applied to an example case in which gas is supplied to the right sealing 17 illustrated in FIG. 3A, assuming that the similar control table is basically applied to a case in which gas is supplied to the left sealing 17. In FIG. 7, moreover, a relation of opening rates is Q1>Q2>Q3>Q4>Q5, where Q1 is the highest opening rate, and Q5 is the lowest opening rate.

In a case where a supply amount of gas is always constant when gas is supplied to a sealing to cool the sealing, the temperature of the sealing is excessively lowered, causing a decrease in heating efficiency of the heater lamp. Moreover, in a case where a high-output heater lamp as a heat source is installed, a supply amount of gas can be increased by an increase in an opening area to cool a sealing with higher efficiency.

In the present embodiment, it is conceivable that adjustment of opening and closing of the valve adjusts a supply amount of gas. Particularly, in the present embodiment, a control table including a relation between a temperature of a sealing based on lighting duty of the heater lamp 14 and an opening rate (%) of the valve 23 is stored in a memory such as the ROM 61. Thus, the CPU 60 adjusts a supply amount of gas based on the control table. Accordingly, an appropriate amount of gas can be supplied in response to the temperature of the sealing. Hence, the temperature of the sealing can become a suitable temperature, and a decrease in heating efficiency of the heater lamp can be prevented. The control table illustrated in FIG. 7 is merely an example, and the present embodiment is not limited thereto.

The description has been given using an example of the opening rate of the valve 23. In the present embodiment, however, an amount of gas can be adjusted based on a control table including a relation between an amount of gas to be supplied from the blower source 20 and a temperature of the sealing based on the lighting duty of the heater lamp 14, instead of the opening rate of the valve 23.

The present disclosure has been described using an example in which the drying apparatus which is disposed in an inkjet image forming apparatus is one example of the heating apparatus according to the present embodiment. However, the present embodiment is not limited to such a drying apparatus. The present embodiment can be applied to a heating apparatus that heats a heating target such as a sheet for a purpose other than drying of the heating target. For example, the present embodiment can be applied to a heating apparatus that is disposed in an electrophotographic image forming apparatus that forms an image with toner.

The inkjet image forming apparatus is one example of a liquid discharge apparatus to which the present embodiment is applied. The term "liquid discharge apparatus" represents an apparatus that includes a liquid discharge unit and drives the liquid discharge unit to discharge liquid to a sheet.

The "liquid discharge apparatus" to which the present embodiment is applied includes a pre-processing apparatus and a post-processing apparatus in addition to units related to feeding, conveyance, and ejection of sheet.

The "liquid discharge apparatus" can include a liquid discharge unit that can move relative to a sheet or a liquid discharge unit that cannot move relative to a sheet. Particular examples of the "liquid discharge apparatus" include a serial-type apparatus that causes a liquid discharge head (a liquid discharge unit) to move, and a line-type apparatus that cause a liquid discharge head (a liquid discharge unit) to not move.

In addition, the "liquid discharge apparatus" is not limited to an apparatus that renders a meaningful image such as text and graphic visible with discharged liquid. Examples of the "liquid discharge apparatus" include not only an apparatus that forms a meaningless image such as patterns, and an apparatus that forms a three-dimensional image, but also a treatment liquid discharge apparatus that discharges treatment liquid to a surface of a sheet to modify the surface of the sheet.

The term "sheet" used in the above description represents a matter to which liquid can be at least temporarily attached. The term "sheet" includes a matter to which liquid is attached and adheres, and a matter to which liquid is attached and permeated. Particular examples of the "sheet" include an electronic substrate, and a recording medium such as paper, a recording sheet, recording paper, a film, and cloth.

The "sheet" can be made of a material such as paper, thread, fiber, cloth, leather, metal, plastic, glass, wood, and ceramic as long as liquid can be even temporarily attached.

Moreover, the "liquid" to be discharged by the "liquid discharge apparatus" should not be limited, and can be any matter as long as the matter has viscosity or surface tension with which the matter can be discharged from a liquid discharge unit. The "liquid" preferably has viscosity of 30 mPa·s or less under normal pressure and temperature or by heating or cooling. More particularly, examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant. Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication.

According to the present embodiment described above, each of the drying units 3A and 3B as heating apparatuses includes the heating drum 9 as a heating rotator, the heater lamp 14 as a heat source, the heater lamp holder 15 as a heater holder, the supporting rod 16 as a support, and the blower source 20 as a gas supply. The heating drum 9 heats a medium S. The heater lamp 14 includes a glass tube disposed inside the heating drum 9 to generate radiant heat, and the sealing 17 on each of both ends of the glass tube in an axial direction of the heating drum 9. The heater lamp holder 15 holds the heater lamp 14 inside the heating drum 9. The supporting rod 16 has an outer diameter smaller than an inner diameter of the heating drum 9, and supports the heater lamp holder 15 inside the heating drum 9. The blower source 20 is disposed outside an outer end of the heating drum 9 in the axial direction to supply gas. The blower source 20 supplies gas to the sealing 17 through the supporting rod 16 from a direction intersecting with the axial direction of the heating drum 9.

Therefore, heating efficiency of the heater lamp 14 (the heat source) is enhanced.

According to the present embodiment as described above, the supporting rod 16 includes a cylinder through which gas can pass.

Such a configuration enables gas to be supplied to the sealing 17 of the heater lamp 14 (the heat source).

According to the present embodiment as described above, the sealing 17 is positioned outside the medium conveyance path 18 as a conveyance region inside the heating drum 9 in the axial direction.

Such arrangement enables the sealing 17 to not overlap with a medium as a dry target.

According to the present embodiment as described above, the ventilation hole 22 as an air hole through which ventilation can be performed is positioned on a face of the heating drum 9 facing the sealing 17.

Thus, gas flows inside the heating drum 9 (the heating rotator) to cool the heater lamp 14, thereby preventing a decrease in heating efficiency. This exposes the sealing 17 to the outside air (atmosphere) outside the heating drum 9, thereby further facilitating cooling of the sealing 17.

According to the present embodiment as described above, the supporting rod 16 extends to the outer side relative to the frame 12, which holds the heating drum 9, in the axial direction of the heating drum 9.

Such arrangement enables not only gas to be readily taken from the blower source 20 (the gas supply unit), but also gas to be readily blown to the sealing 17.

According to the present embodiment as described above, the valve 23 as a gas adjuster is disposed. The valve 23 adjusts an amount of air to be supplied from the blower source 20 to the supporting rod 16.

Thus, for example, in a case where a heater lamp (a heat source) having a higher output is disposed, an opening area of the valve 23 is increased to increase a supply amount of gas, thereby cooling the sealing 17 with good efficiency, or preventing a decrease in heating efficiency of the heater lamp due to an excessive decrease in the temperature of the sealing.

According to the present embodiment as described above, the drying unit 3A (3B) includes the temperature sensor unit 24 including the temperature sensor 25 for detecting the temperature of the heating drum 9.

Thus, a surface temperature of the heating drum 9 is maintained at a predetermined temperature.

According to the present embodiment as described above, the blower source 20 supplies gas to an interior of the temperature sensor unit 24.

Such a configuration can prevent an increase in temperature of the sealing 17 of the heater lamp 14. In addition, a detection surface of the temperature sensor 25 can be prevented from being soiled.

According to the present embodiment as described above, the drying unit 3A (3B) includes the air blowing distribution box 28 as a gas distributor that distributes gas supplied from the blower source 20 to the temperature sensor unit 24 and the supporting rod 16.

Thus, since such a configuration enables gas to be supplied to both of the sealing 17 and the interior of the temperature sensor unit 24, the apparatus can be made compact and the cost of the apparatus can be reduced.

According to the present embodiment, heating efficiency of the heater lamp 14 can be enhanced.

Although the present embodiment has been described, the present embodiment is not limited to the above-described example, and modifications are possible without departing from scope of the disclosure.

The above description is merely one example. The present disclosure can provide effects described below.

Aspect 1

A heating apparatus includes a heating rotator (e.g., a heating drum 9), a heat source (e.g., a heater lamp 14), a heater holder (e.g., a heater lamp holder 15), a support (e.g., a supporting rod 16), and a gas supply (e.g., a blower source 20). The heating rotator heats a medium. The heat source includes a glass tube disposed inside the heating rotator to generate radiant heat, and a sealing (e.g., a sealing 17) on each of both ends of the glass tube in an axial direction of the heating rotator. The heater holder holds the heat source inside the heating rotator. The support has an outer diameter smaller than an inner diameter of the heating rotator, and supports the heater holder inside the heating rotator. The gas supply is disposed outside an outer end of the heating rotator in the axial direction, and supplies gas to the sealing through the support (16) in the axial direction. The heating rotator has an air hole (e.g., a ventilation hole 22) facing the sealing, and the air hole discharges the gas blown to the sealing from the air hole in a transverse direction orthogonal to the axial direction.

Aspect 2

In the heating apparatus with the aspect 1, the support includes a cylinder, and the gas supply supplies the gas to the sealing through an interior of the cylinder in the axial direction.

Aspect 3

In the heating apparatus with the aspect 1 or 2, the heating rotator has a conveyance region to convey a medium in the axial direction, and the sealing is disposed outside the conveyance region inside the heating rotator in the axial direction.

Aspect 4

In the heating apparatus with any of the aspects 1 through 3, the heating rotator has the air hole on a face of the heating rotator facing the sealing, and the air hole discharges the gas blown to the sealing from the air hole in the transvers direction orthogonal to the axial direction.

Aspect 5

The heating apparatus with any of the aspects 1 through 4 further includes a frame (e.g., a frame 12) that holds the heating rotator, and the support extends outside the frame in the axial direction.

Aspect 6

The heating apparatus with any of the aspects 1 through 5 further includes circuitry that adjusts an amount of gas to be supplied from the gas supply to the support.

Aspect 7

The heating apparatus with any of the aspects 1 through 6 further includes a temperature sensor (e.g., a temperature sensor 25) that detects temperature of the heating rotator.

Aspect 8

In the heating apparatus with the aspect 7, the gas supply supplies the gas to the temperature sensor.

Aspect 9

The heating apparatus with the aspect 8 further includes a gas distributor (e.g., an air blowing distribution box 28) that distributes the gas supplied from the gas supply to the support and the temperature sensor.

Aspect 10

An image forming apparatus (e.g., an image forming apparatus 100) includes the heating apparatus with any of the aspects 1 through 9, and an image forming unit (e.g., each of printing units 2A and 2B) that forms an image onto the medium. The heating apparatus heats the medium onto which the image has been formed by the image forming unit.

Aspect 11

A liquid discharge apparatus includes the heating apparatus with any of the aspects 1 through 9, and a liquid discharge head (e.g., a liquid discharge head 132) that discharges a liquid onto the medium. The heating apparatus heats the medium onto which the liquid has been discharged by the liquid discharge head.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A heating apparatus comprising:

a heating rotator to heat a medium;

a heat source including:

a glass tube disposed inside the heating rotator to generate radiant heat; and a sealing on each of both ends of the glass tube in an axial direction of the heating rotator;

a heater holder to hold the heat source inside the heating rotator;

a support having an outer diameter smaller than an inner diameter of the heating rotator to support the heater holder inside the heating rotator; and a gas supply disposed outside an outer end of the heating rotator in the axial direction, the gas supply to supply gas to the sealing through the support in the axial direction, wherein the heating rotator has an air hole facing the sealing, and the air hole discharges the gas blown to the sealing from the air hole in a transverse direction orthogonal to the axial direction.

2. The heating apparatus according to claim 1, wherein the support includes a cylinder, and the gas supply supplies the gas to the sealing through an interior of the cylinder in the axial direction.

3. The heating apparatus according to claim 1, wherein the heating rotator has a conveyance region to convey a medium in the axial direction, the sealing is disposed outside the conveyance region inside the heating rotator in the axial direction.

4. The heating apparatus according to claim 1, wherein the heating rotator has the air hole on a face of the heating rotator facing the sealing, and the air hole discharges the gas blown to the sealing from the air hole in the transverse direction orthogonal to the axial direction.

5. The heating apparatus according to claim 1, further comprising a frame to hold the heating rotator, wherein the support extends outside the frame in the axial direction.

6. The heating apparatus according to claim 1, further comprising circuitry configured to adjust an amount of gas to be supplied from the gas supply to the support.

7. The heating apparatus according to claim 1, further comprising a temperature sensor to detect temperature of the heating rotator.

8. The heating apparatus according to claim 7, wherein the gas supply supplies the gas to the temperature sensor.

9. The heating apparatus according to claim 8, further comprising a gas distributor to distribute the gas supplied from the gas supply to:

the support; and the temperature sensor.

10. An image forming apparatus comprising:

the heating apparatus according to claim 1; and an image forming unit to form an image onto the medium, wherein the heating apparatus heats the medium onto which the image has been formed by the image forming unit.

11. A liquid discharge apparatus comprising:

the heating apparatus according to claim 1; and a liquid discharge head to discharge a liquid onto the medium, wherein the heating apparatus heats the medium onto which the liquid has been discharged by the liquid discharge head.

* * * * *